Nov. 17, 1970    O. W. FREITAG    3,540,315
HIGH-SPEED CUTTER FOR MACHINING SOFT PLASTIC MATERIAL
Filed Nov. 21, 1968    3 Sheets-Sheet 1

INVENTOR:
Otto W. Freitag
BY
ATTORNEYS

Nov. 17, 1970   O. W. FREITAG   3,540,315
HIGH-SPEED CUTTER FOR MACHINING SOFT PLASTIC MATERIAL
Filed Nov. 21, 1968   3 Sheets-Sheet 2

INVENTOR:
Otto W. Freitag
BY
ATTORNEYS

Nov. 17, 1970   O. W. FREITAG   3,540,315
HIGH-SPEED CUTTER FOR MACHINING SOFT PLASTIC MATERIAL
Filed Nov. 21, 1968   3 Sheets-Sheet 3
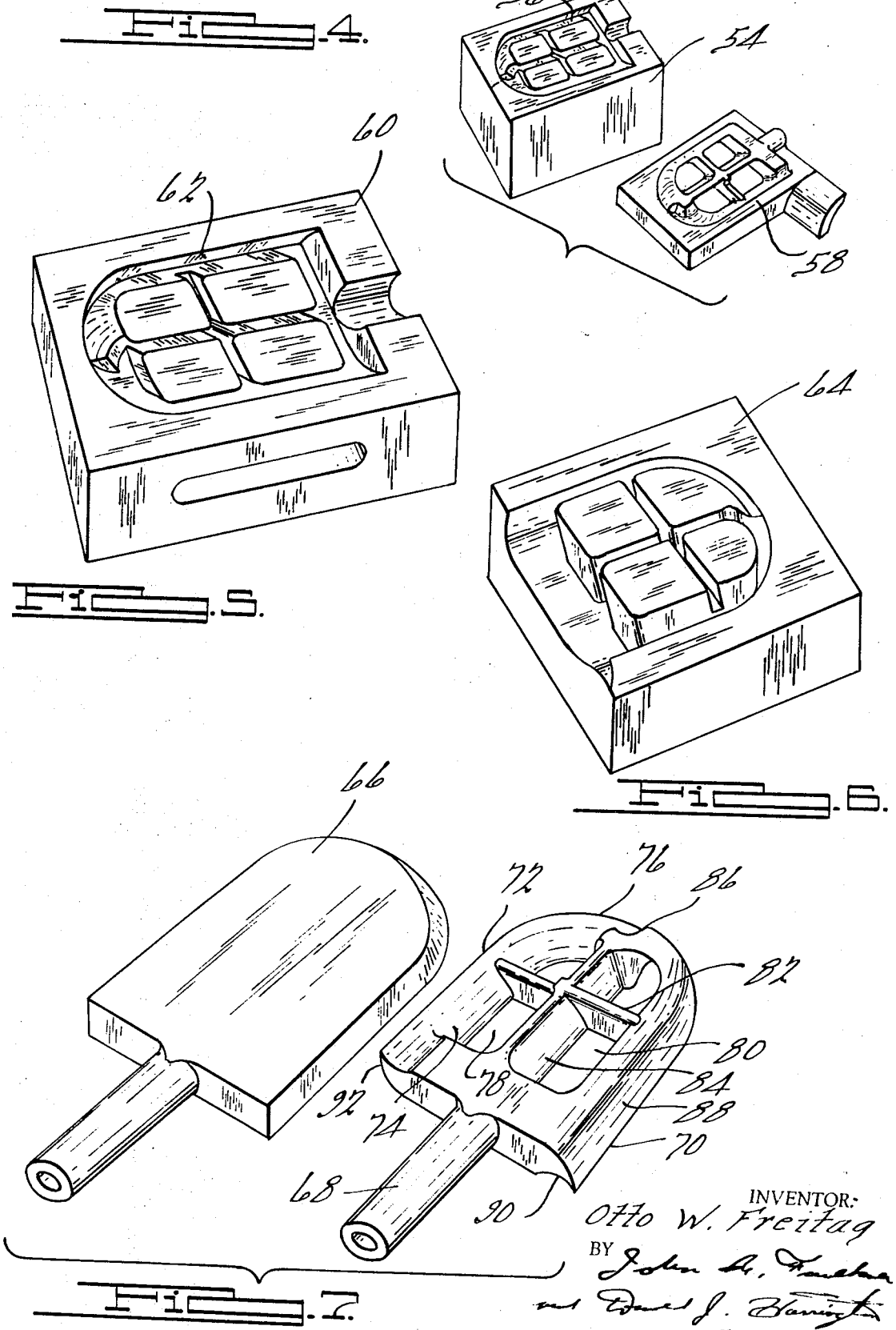

United States Patent Office 3,540,315
Patented Nov. 17, 1970

---

3,540,315
HIGH-SPEED CUTTER FOR MACHINING SOFT PLASTIC MATERIAL
Otto W. Freitag, Dearborn, Mich., assignor to Ford Motor Company, Dearborn, Mich., a corporation of Delaware
Filed Nov. 21, 1968, Ser. No. 777,559
Int. Cl. B21k 5/70
U.S. Cl. 76—107
2 Claims

ABSTRACT OF THE DISCLOSURE

A high-speed rotary cutting tool for machining styrofoam patterns and a method for manufacturing the cutter, said cutter comprising a balanced, curvilinear cutting edge symmetrically disposed about its axis of rotation with cutting edges formed on a semi-circular part of the cutter for face machining and with rough cutting edges formed on generally tangential portions of the cutter, the central region of the cutter having openings through which chips are discharged as they are removed from the styrofoam workpiece.

GENERAL DESCRIPTION OF THE INVENTION

My invention is adapted especially to be used for forming plastic developments for a finished casting. The developments would be used as a pattern of the finished part in a closed mold process. In practicing the casting method, a surface layout is made representing the desired die information. Sections are marked and identified with appropriate numerical data. An automatic drafting machine of the type used in body engineering activities in the automotive industry is used for digitizing the sections by use of an integral, parabolic interpolator which establishes the coordinates of selected points intermediate the points that are identified by the draftsman.

The identified points, as well as the digitized points, are scanned by a television camera-type scanner, and the coordinates of selected points on the characteristic lines are stored on tape. The stored information is used to prepare template drawings of selected sections on cardboard. The templates then are cut after the necessary scale factors and circuit factors are introduced into the stored program data.

A plaster development of the finished part is prepared with the aid of the templates. The plaster development is used with a duplicating pantograph mechanism for controlling the motion of the improved cutting tool of my invention. The pantograph mechanism causes the tool to follow the contours of the plaster development as a three-dimensional styrofoam model is cut. In carrying out this step, a tracer, which is larger in diameter than the cutter, follows the contour of the plaster development along selected lines. This produces a one-half inch machining stock on the surface of the styrofoam model.

The styrofoam model is encased with treated sand. The sand mold thus prepared is used to form a casting by the well-known closed mold process.

The cutter is formed by preparing initially a plastic model having the desired geometric characteristics. The model is used to form the female plaster die section. This in turn is used to form a male plastic model. A female plastic master model then is made for copying the shape of the cutter onto a carbon electrode. The carbon electrode is made on a pantograph-type cutter using the master model for the input data.

A cutter blank made from high carbon alloy steel such as SAE 5132 vanadium alloy steel, heat treated to 44 to 46 rockwell "C" hardness, is prepared with the general cutter configuration. The cutter blank is used to obtain a cutter configuration using the carbon electrode and an electrical discharge machining process. The blank is thus machined on one side to produce a cutting edge on one side of the cutter, and the blank then is turned over to permit machining of the companion cutting edge with the same carbon electrode.

The configuration of the cutter permits excellent chip clearance. The relief angle on the cutter produces a draft of air which causes the chips to be cleared from the cutting area, thereby permitting the operator to view work at all times. The electrical discharge machined blade is perfectly balanced without any finish machining. Furthermore, the tool need not be finish ground since it is possible to obtain a razor-sharp cutting edge during the electrical discharge machining procedure.

BRIEF DESCRIPTION OF THE FIGURES OF THE DRAWINGS

FIG. 4 shows a plaster mold made from the model of FIG. 3 and a plastic model of the cutter made from the mold.

FIG. 5 shows a plastic master model of the cutter.

FIG. 6 shows a carbon electrode which was machined on a pantograph using the master model of FIG. 5 as the source of input information.

FIG. 7 shows a flat metal blade used as a blank in the electrical discharge machining procedure and the finished part.

PARTICULAR DESCRIPTION OF THE INVENTION

Figure 1A:
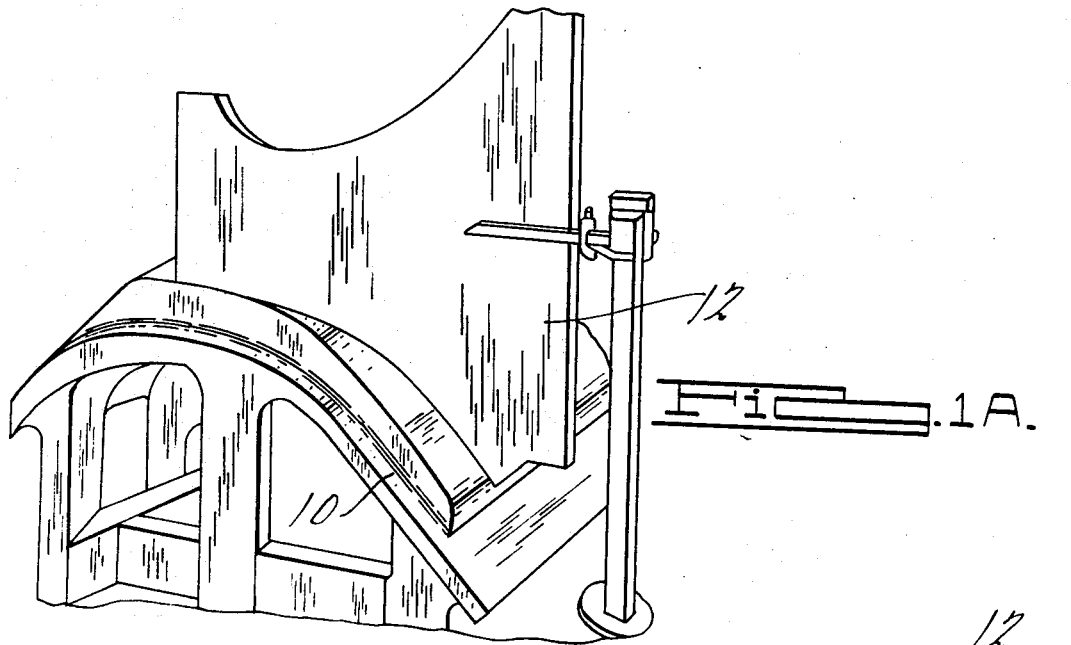
FIGS. 1A and 1B show a template being used with a plaster development to check a general surface configuration of the plaster development.
Figure 1B:
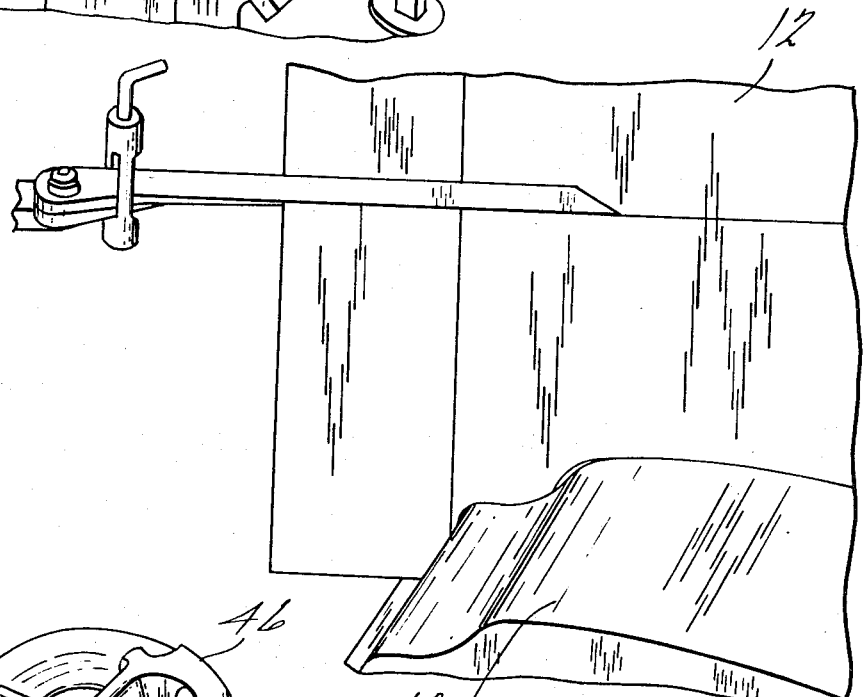

In FIGS. 1A and 1B numeral 10 designates a plaster development of the finished part. Numeral 12 designates a template having on one margin thereof the desired contour of the surface of the development 10 at selected characteristic lines. The template 12 is cut from cardboard on which is drawn the template outline by means of an antomatic machine. Input data for the drafting machine is obtained by comparing a separate layout with the appropriate design information. The layouts are marked in sections, and a control tape is prepared by scanning selected points on the sections and feeding the coordinate data obtained with the scanner into the control system for an automatic drafting machine. By means of an inherent digitizing control capability, the drafting machine produces a continuous curve between the selected points. After the necessary scale factors, the offset, axes of rotation of selected sections, and other parameters are introduced into the storage or memory system of the drafting machine, the templates are drawn on a paper or cardboard and then cut. The templates are used to form the plaster development shown at 10 in FIGS. 1A and 1B.

Figure 2:
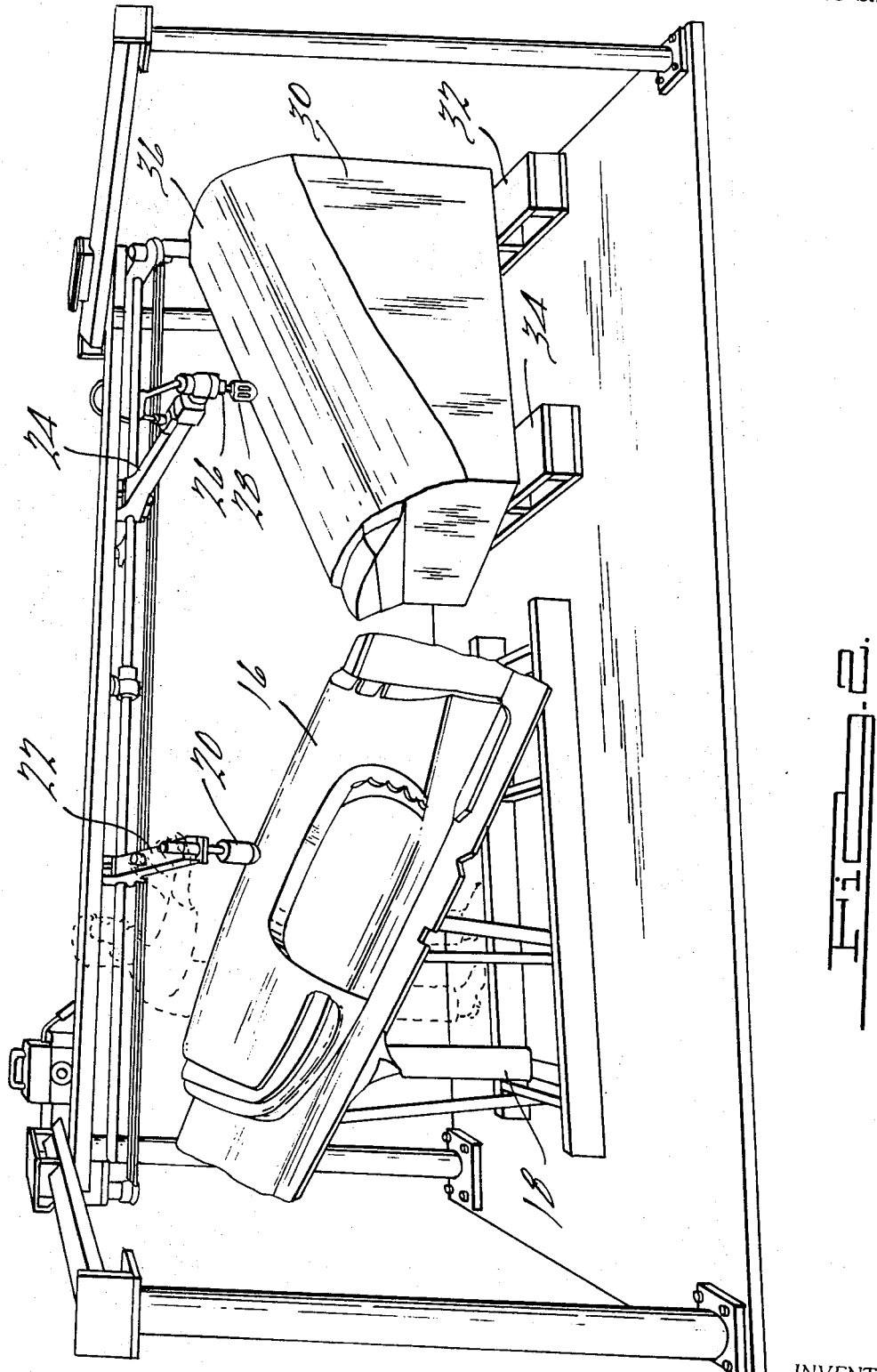
FIG. 2 shows a styrofoam model being machined by a pantograph machining mechanism which employs a plaster development of a finished part.

FIG. 2 shows a plaster development 16 mounted on supporting structure 18 in a duplicating pantograph machine. A tracer 20 is passed over the surface of the reproduction 16 along prescribed lines. The motion of the tracer 20 is transmitted through the pantograph mechanism, including motion transmitting arms 22 and 24, to a tool holder shown at 26. This holder receives the improved tool of my invention as indicated at 28.

Styrofoam pattern 30 is mounted on surfaces 32 and 34. The machined surface 36 of the styrofoam is machined by the cutter 28, thereby reproducing the surface of the development 16. The incremental motion of the tracer 20 is duplicated by the motion of the cutter 28.

The cutter 28 is produced by an electrical discharge machining procedure, which I will now describe.

Figure 3:
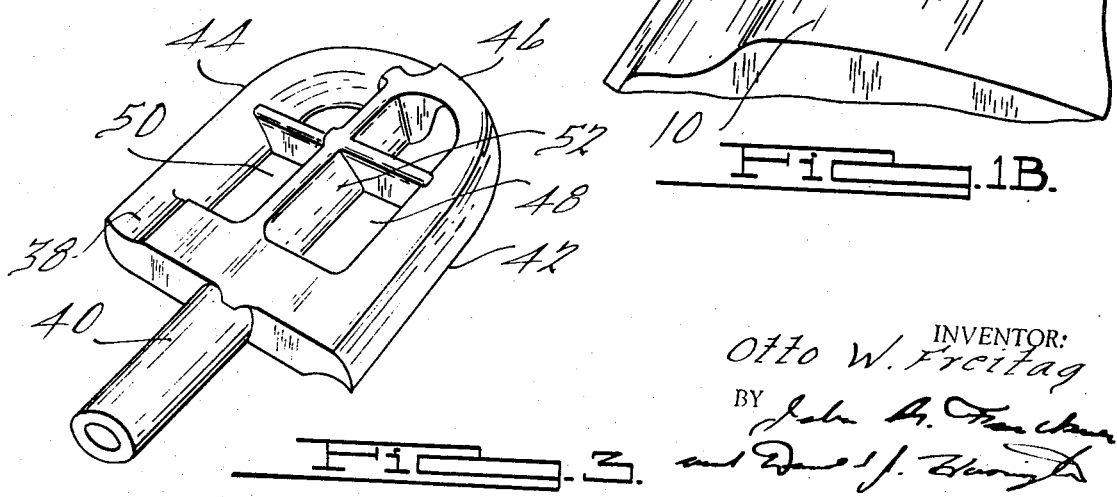
FIG. 3 shows a plastic model of my improved cutter.

A plastic model of the cutter is made as indicated at 38 in FIG. 3. This is a scaled representation of the cutter with all the characteristic dimensions of the finished part. It includes a stem 40 which is held in the tool holder, the axis of the stem forming the axis of the revolution of the cutter itself.

The cutter has two cutting surfaces generally identified by reference characters 42 and 44. These form tangents to the circular portion of the cutting edge shown at 46 at the end of the tool itself.

Apertures 48 and 50 are formed on the body of the tool, and a strengthening rib 52 extends generally in the direction of the axis of the stem 40 to the base tip of the cutter.

The plastic model of FIG. 3 is used to prepare a female plaster reproduction as indicated in FIG. 4. This is journalled at 54, the recesses in the mold being generally identified by reference characters 56. This plaster mold is used to form a male plastic reproduction of the tool as indicated by reference character 58.

A plastic reproduction 58 is used to form a female plastic model master as indicated at 60 in FIG. 5. The recesses 62 in the surface of the model 60 generally conform to the dimensions of the plastic model 58. The model 60 is used with a pantograph machining mechanism to produce a carbon electrode indicated in FIG. 6 at 64. This electrode is a substantial duplicate, insofar as the dimensions are concerned, of the model 60 of FIG. 5.

A cutter blank of uniform flat configuration is formed from a piece of SAE 5132 vanadium alloy steel stock which may be heat treated to a rockwell "C" hardness of 44 to 46. Although materials can be used other than this particular steel alloy, I prefer the physical characteristics of this steel.

Electrical discharge machining methods are well known at this time in the industry. These procedures are described, for example, in Metal Progress magazine for October 1967, pages 199 through 207. Another pertinent article is in Product Engineering magazine for Sept. 27, 1965, p. 53 through 57. Both of these publications are well known technical publications in the United States.

As indicated in FIG. 7, the cutter has a stem 68 and a pair of cutting edges shown at 70 and 72. Edge 72 is situated on the upper side of the cutter, as shown in FIG. 7, and edge 70 is facing downwardly. The cutting edge is formed during the electrical discharge machining procedure with the electrode of FIG. 6 by removing metal to form a cavity 74.

The cutting edges 70 and 72 are generally parallel to each other. Cutting edge 72 forms a tangent through a circular portion of the cutting edge as shown at 76.

The electrode removes metal from the center of the blank 66 to form openings 78 and 80 which may be bridged by strengthening ribs 82 and 84. The cutting edges 70 and 72 join at the base point 86 of the cutter and define one continuous cutting edge about the periphery of the cutter when the blank 56 is positioned below the electrodes. The metal is removed to form the recess 74 at the same time that metal is removed from the opposite side of the tool as shown at 88. This removal of metal assists in the formation of the cutting edge 70.

After this portion of the electrical discharge machining procedure is completed, the blank is turned over and the electrode again is energized and advanced toward the workpiece. At this time metal is removed to form recess 90, which corresponds to the recess 74. Metal is removed from the opposite side of the electrode adjacent the cutting edge 72 as shown at 92. This corresponds to the removal of metal from edge 88. As a result of this twin machining procedure, first on one side of the electrode and then on the other, a perfectly symmetrical cutter is formed. The cutting edges that are produced are razor sharp and no finish grinding is required. The cutter is symmetrical and dynamically balanced.

The apertures in the center of the cutting tool permit discharge of the chips during the machining operation. The cutting edges of the tool act as aerodynamic blades and creates a draft which blows the chips away from the workpiece and through the opening, thereby keeping the surface of the workpiece clean at all times. This avoids obstructing the operator's view during the machining operation.

By preference, I operate the cutting tool at about 10,000 r.p.m. The rough hobbing operation is produced by the linear portions of the cutting edge which are tangent to the circular base portion. The finish cutting of the pattern is produced by the semi-circular portion of the cutting edge nearer the base tip point 86. Thus both rough cutting and finish cutting can occur during the same pass across the surface of the pattern.

Having thus described a preferred form of my invention, what I claim and desire to secure by U.S. Letters Patent is:

1. A method for forming a high-speed, rotary cutting tool for cutting soft materials, said cutter having generally parallel, straight, cutting edges and a generally circular finish cutting edge, the finish cutting edge and the parallel cutting edges forming a continuous edge, forming a plastic model having the geometric characteristics of the finished cutter, preparing a plaster mold of the model, preparing a plastic model using the aforesaid plaster mold, preparing a plastic female master model using the plastic model of the aforesaid step, copying the geometric characteristics of the plastic master model onto a carbon electrode, machining a piece of flat, hard steel stock of predetermined thickness, machining said stock with said electrode using an electrical discharge machining procedure thereby forming one cutting edge, inverting the position of the blank with respect to the electrode and repeating the aforesaid electrical discharge procedure thereby completing the cutting edges.

2. The combination as set forth in Claim 1 wherein metal is removed from one side of one cutting edge and one side of the second cutting edge when said blank assumes one of said positions and metal is removed from the other side of said one cutting edge and the other side of the second cutting edge when the position of said blank is inverted.

References Cited

UNITED STATES PATENTS 3,461,749    8/1969    Gagne _____ 76—107
3,498,158    3/1970    Kougel _____ 76—107

BERNARD STICKNEY, Primary Examiner

U.S. Cl. X.R.

29—103; 219—69